(12) United States Patent
Wang et al.

(10) Patent No.: US 7,358,470 B2
(45) Date of Patent: Apr. 15, 2008

(54) OPTICAL PICKUP

(75) Inventors: Jinn-Kang Wang, Yung-Ho (TW);
Tsung-Min Yang, Hsinchu (TW)

(73) Assignee: TopRay Technologies, Inc., Hsinchu (TW)

( * ) Notice: Subject to any disclaimer, the term of this patent is extended or adjusted under 35 U.S.C. 154(b) by 32 days.

(21) Appl. No.: 11/373,379

(22) Filed: Mar. 10, 2006

(65) Prior Publication Data

US 2007/0210243 A1  Sep. 13, 2007

(51) Int. Cl.
*G02B 7/04* (2006.01)
*G02B 5/18* (2006.01)
*G02F 1/01* (2006.01)
*G11B 7/00* (2006.01)

(52) U.S. Cl. .............. 250/201.5; 250/225; 369/44.13; 369/44.23; 359/569

(58) Field of Classification Search .......... 250/225, 250/228, 237 R, 237 G, 201.2, 201.5, 216, 250/222.1; 359/569, 566, 573, 719; 369/110.01, 369/110.04, 112.17, 121–122, 44.13, 44.14, 369/44.15, 44.23, 44.29, 44.27, 59.11

See application file for complete search history.

(56) References Cited

U.S. PATENT DOCUMENTS

| 5,644,563 A * | 7/1997 | Yang .................. 369/44.23 |
| 7,110,180 B2 * | 9/2006 | Kawasaki et al. ......... 359/569 |
| 2006/0013090 A1 * | 1/2006 | Yokoi .................. 369/47.53 |

\* cited by examiner

*Primary Examiner*—Georgla Epps
*Assistant Examiner*—Don Williams

(57) ABSTRACT

An optical pickup with a reflective coating device is provided, including a laser diode (LD), an optical element, and a photo detector integrated circuit (PDIC). The LD emits 1-3 lights with different wavelengths but the same polarization orientation. The beam transmits through the optical element set and focus on a recording media for data reading and writing. The beams are reflected by the recording media, through the optical element set, and detected by the PDIC for signal detection. The optical element set further includes a grating, a reflective coating device, and an objective lens. By using the reflective coating device to change the linear polarization orientation of the emitting light and the feedback light for 90° angle, the relative intensity noise caused by the feedback light in LD can be reduced.

10 Claims, 4 Drawing Sheets

OPTICAL PICKUP

FIELD OF THE INVENTION

The present invention generally relates to an optical pickup, and more specifically to an optical pickup with a reflective coating device.

BACKGROUND OF THE INVENTION

The compact disc (CD), video compact disc (VCD) and digital video disc (DVD) are widely used in offices, household and personal information and entertainment. Therefore, the industry has been researching to develop more efficient optical pickup technology to improve the quality of the recording media, such as CD, VCD, and DVD.

An optical pickup reads or writes data on the recording media. In general, an optical pickup employs a laser diode (LD) to emit an optical beam through an optical element set to focus on the surface of the recording media. A photo detector integrated circuit (PDIC) is used for receiving the optical signal or detecting the strength of the optical signal.

FIG. 1 shows a schematic view of a conventional optical pickup. The optical pickup is used with a recording media 101 to read or write data to recording media 101. The optical pickup includes a photo detector integrated circuit (PDIC) 102, a laser diode (LD) 103, a polarized bean splitter 104, a quarter wave plate 105, a collimator lens 106 and an objective lens 107.

LD 103 emits a laser beam through polarized beam splitter 104, quarter wave plate 105, collimator lens 106 and objective lens 107 to focus on the surface of recording media 101. The laser beam is then reflected by the surface of recording media 101, through objective lens 107, collimator lens 106, quarter wave plate 105, and polarized beam splitter 104 to PDIC 102. PDIC 102 detects the strength of the laser signal. Polarization directions 109, 108, 110 indicate the polarization status of the emitting beams and the feedback beam, respectively.

The optical pickup may also use a plurality of optical lenses and polarized beam splitters to guide the emitting laser beam to recording media 101 and the reflecting beam to PDIC for reading or writing data.

Polarized beam splitter 104 is for transmitting and reflecting laser beam. Because of the material cost and the manufacture quality, polarized beam splitter 104 is a high-priced element in an optical pickup. In addition, quarter wave plate 105 also requires higher precision in a tedious manufacturing process, it is also an expensive element of the optical pickup.

SUMMARY OF THE INVENTION

The present invention has been made to overcome the above-mentioned drawback of conventional optical pickups. The primary object of the present invention is to provide an optical pickup with a reflective coating device, an LD, an optical element set, and a PDIC. The LD emits 1-3 lights with different wavelengths but the same linear polarization orientation. The beams transmit the optical element set and focus on a recording media for data reading and writing. The beams then are reflected by the recording media, through the optical element set, and detected by the PDIC for signal detection.

The optical element set further includes a grating, a reflective coating device, and an objective lens. The grating splits a beam into three beams. The reflective coating device provides the function of transmitting and reflecting the laser beam and changes one or two or all of the three wavelengths the phase difference and linear polarization orientation. A coupling lens can be added to the optical element set to adjust the collimation of the laser beam and improve the optical efficiency. The coupling lens is an optional element. The objective lens is for focusing the beam.

The LD emits the lights with the same linear polarization orientation to the reflective coating device with an incident polarization orientation angle $\alpha$, and the lights with different wavelengths are transformed into circular or oval polarized lights. The reflected lights from the recording media back to the reflective coating device are transformed into linear polarized lights and fed back to a laser diode cavity. The orientation of feedback linear polarized light and the original linear polarized light have a 90° angle difference.

The reflective coating device comprises one or more reflective lenses; or alternatively, one or more reflective lenses and transmitting lenses.

By using the reflective coating device to change the linear polarization orientation of the emitting light and the feedback light for 90°, the relative intensity noise caused by the feedback light in LD can be reduced.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
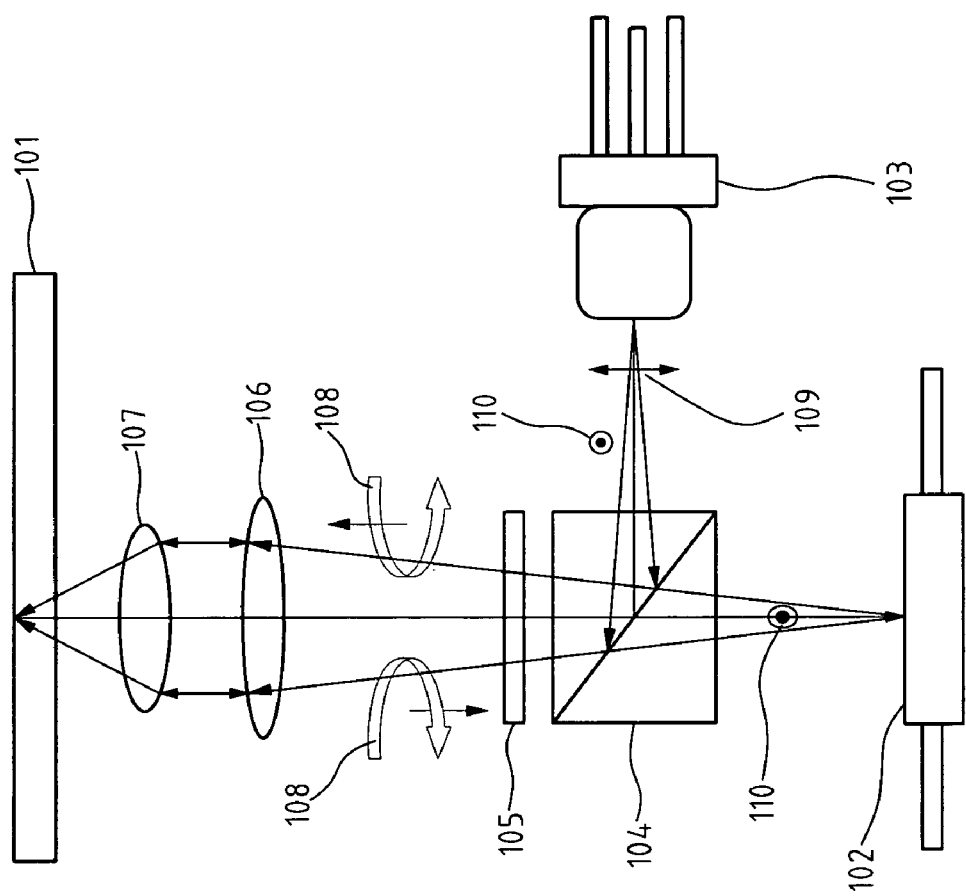
FIG. 1 shows a schematic view of the structure of a conventional optical pickup.
Figure 2:
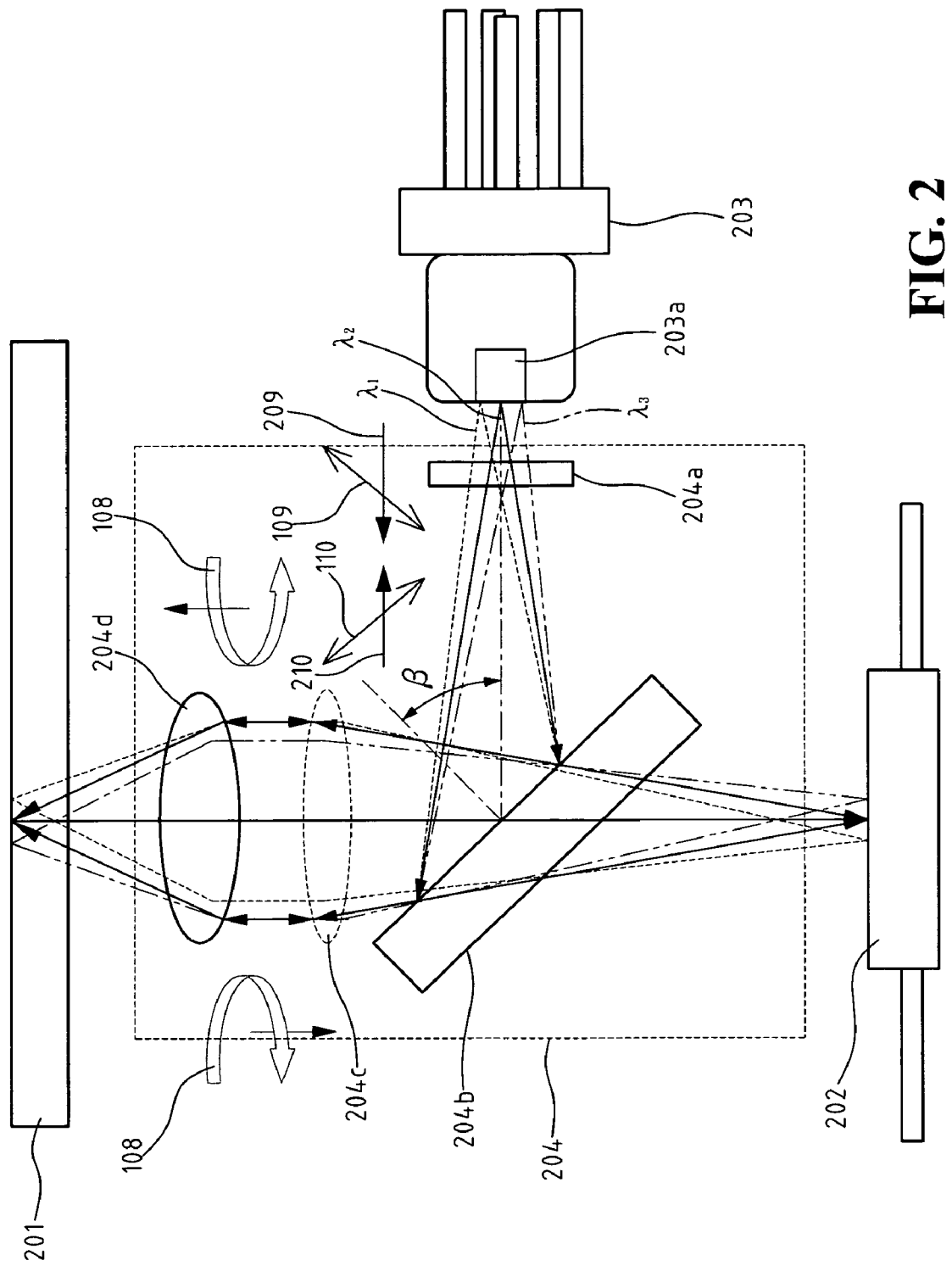
FIG. 2 shows a schematic view of the structure of an optical pickup of the present invention.

FIG. 2 shows a schematic view of the structure of an optical pickup of the present invention, applicable to a recording media 201. The optical pickup includes a photo detector integrated circuit (PDIC) 202, a laser diode (LD) 203, and an optical element set 204. Optical element set 204 further includes a grating 204a, a reflective coating device 204b and an objective lens 204d. An optional coupling lens 204c can be added to optical element set 204.

LD 203 emits lights of 1-3 different wavelengths λ1, λ2, λ3. All the lights have the same linear polarization orientation. The linear polarized lights transmit through grating 204a, reflective coating device 204b, coupling lens (optional) 204c, and objective lens 204d, then focus on recording media 201. The surface of recording media 201 reflects the lights through objective lens 204d, coupling lens (optional) 204c, and reflective coating device 204b. The lights transmitting reflective coating device 204b are received and detected by PDIC 202, and the lights reflected by reflective coating device 204b are received and fed back to laser diode cavity 203a.

Recording media 201 uses the emitted light to read or record data. PDIC 202 receives the reflected lights and detects the signal strength of the reflected lights. Grating 204a can split a beam of laser lights into three beams. Objective lens has a fixed focal length to focus the lights into a spot. Coupling lens 204c, an optional element, collimates the light into a collimated beam. Reflective coating device 204b allows a part of the lights to transmit, while reflecting a part of the light.

As shown in FIG. 2, when LD 203 emits lights of 1-3 different wavelengths $\lambda 1$, $\lambda 2$, $\lambda 3$, with the same linear polarization orientation 109, linear polarized lights are projected to reflective coating device 204b with an incident polarization orientation angle α and an incident angle β. Reflective coating device 204b reflects $\lambda 1$, $\lambda 2$, $\lambda 3$, into circular or oval polarized lights 108. Circular or oval polarized lights 108 remain as circular or oval polarized after reflected by recording media 201. Circular or oval polarized lights 108 are reflected again by reflective coating device 204b into linear polarized lights 110, and fed back to laser diode cavity 203a.

The reflective coating device comprises one or more reflective lenses; or alternatively, one or more reflective lenses and transmitting lenses, so that the feedback linear polarized lights 110 have a 90° angle change from the original linear polarized lights 109.

Figure 3:
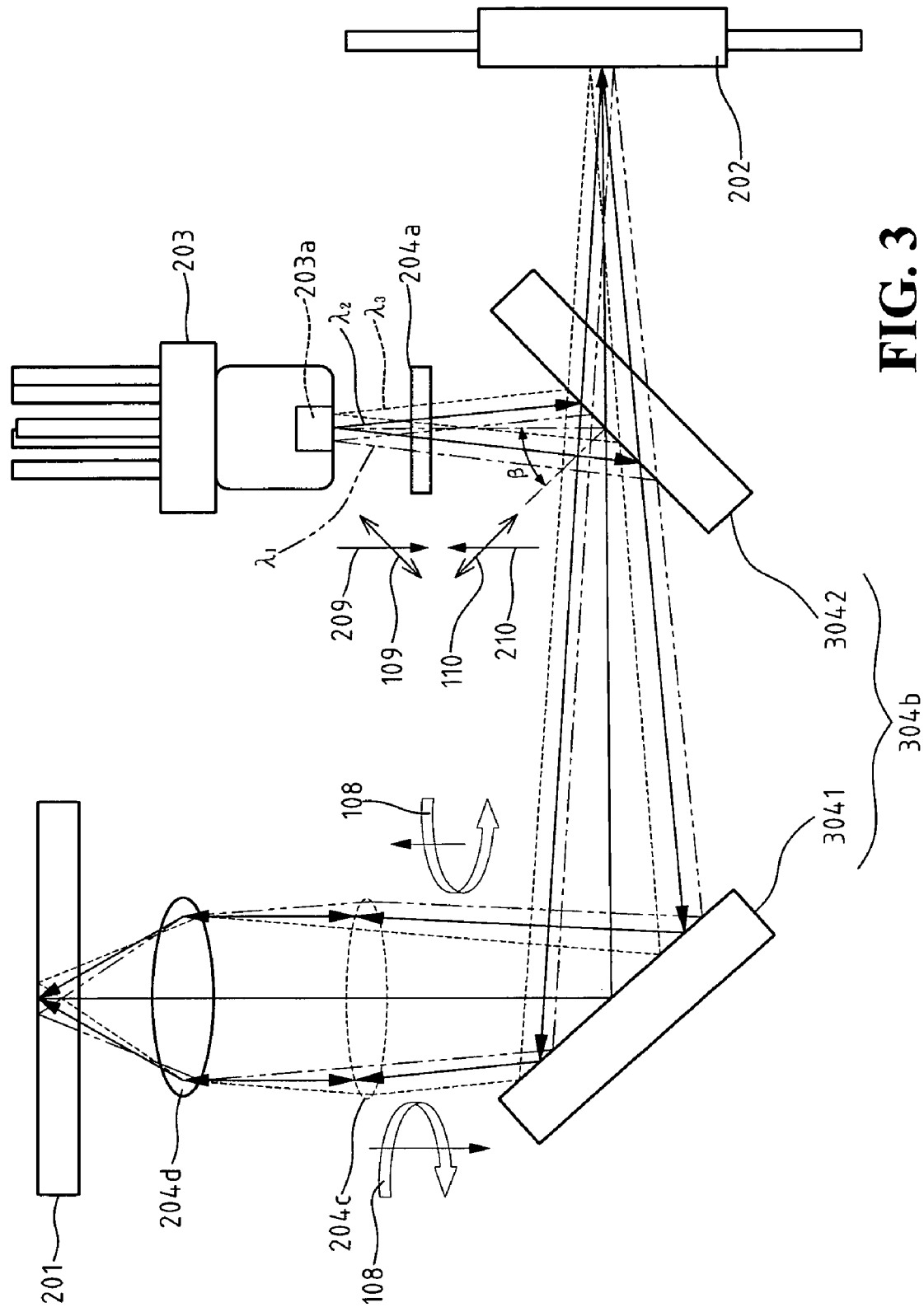
FIG. 3 shows an embodiment of the reflective coating device having two reflective lenses according to the present invention.

Without the loss of generality, FIG. 3 shows an embodiment of the reflective coating device with two reflective mirrors. As shown in FIG. 3, reflective mirrors 3041, 3042 form reflective coating device 304b to change the linear polarization orientation of emitting light 209 and feedback light 210 for a 90° angle.

Figure 4:
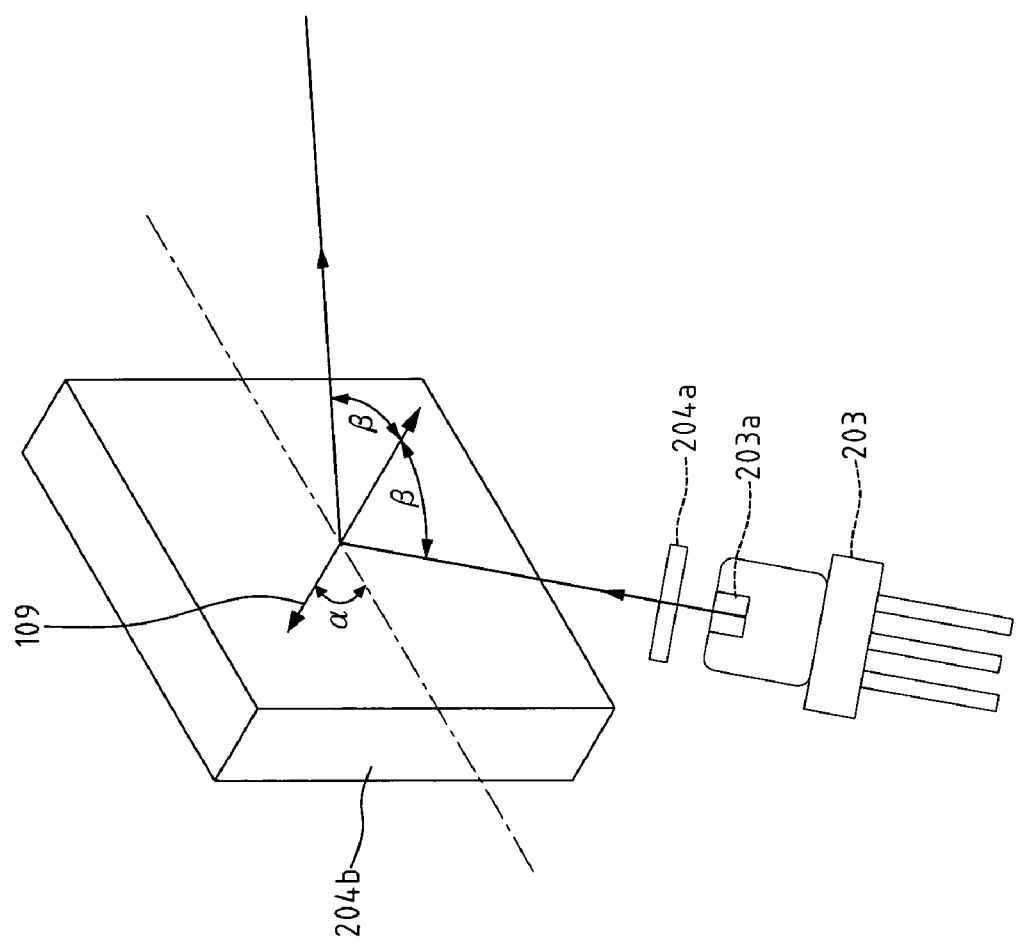
FIG. 4 shows a schematic view of the angles between the linear polarization orientation of the laser beam and the incident angle to the reflective coating device.

FIG. 4 shows a schematic view of the linear polarization orientation and the incident angle between the laser beam and the reflective coating device. As shown in FIG. 4, linear polarized lights 109 from the LD are projected to the reflective coating device with an incident polarization orientation angle α. The incident polarization orientation angle α can range from 10°-80°, or 100°-170°. Typically, the reflective coating device has a reflectivity of 10%-99.9%, with the angle of incidence β within the range of 15°-85°. Through the reflective coating device, the phase angle delay of the "P" state and the "S" state for one or two or all of $\lambda 1$, $\lambda 2$, $\lambda 3$, becomes 90°±60°; that is, linear polarized lights 109 become circular or oval polarized lights 108, where circular polarized lights 108 have the "P" state and the "S" state phase angle delay of 90°, and oval polarized lights 108 have the phase angle delay of 30°-150°.

Refer to FIG. 3, emitting linear polarized lights 209 are reflected by reflective mirrors 3041, 3042 of reflective coating device 304b into circular or oval polarized lights 108. Circular or oval polarized lights 108 are reflected by recording media 201, and then reflected again by reflective mirrors 3041, 3042 of reflective coating device 304b into linear polarized lights 210. When the lights are reflected by the reflective coating device for the second time, the phase angle delay of the "P" state and the "S" state for one or two or all of $\lambda 1$, $\lambda 2$, $\lambda 3$ becomes 180°. The final linear polarized lights 210 and the original linear polarized lights 209 have an angle difference of 90°, and linear polarized lights 210 are fed back to laser diode cavity 203a.

The changes of the linear polarization orientation by 90° angle leads to the reduction of relative intensity noise caused by the feedback light 210.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An optical pickup, comprising:
   a laser diode for emitting a plurality of first linear polarized laser lights;
   a photo detector integrated circuit for receiving and detecting the signal strength of a reflected light reflected from a recording media; and
   an optical element set comprising a grating, a reflective coating device, and an objective lens;
   wherein said optical element set is placed between said laser diode and said photo detector integrated circuit so that said reflective coating device reflects said first linear polarized laser lights into first circular or oval polarized lights to focus on said recording media, said recording media reflects said first circular or oval polarized lights into second circular or oval polarized lights back to said reflective coating device, and said reflective coating device passes a part of said second circular or oval polarized lights to said photo detector integrated circuit and reflects a part of said second circular or oval polarized lights into second linear polarized lights to said laser diode, said first and second linear polarized lights having a 90° angle of polarization orientation change caused by said reflective coating device.

2. The optical pickup as claimed in claim 1, wherein said optical element set further comprises a coupling lens.

3. The optical pickup as claimed in claim 1, wherein said reflective coating device changes the phase angle delay and the linear polarization orientation of said first linear polarized laser lights.

4. The optical pickup as claimed in claim 1, wherein said laser diode issues 1-3 types of lights with different wavelengths $\lambda 1$-$\lambda 3$ and a same linear polarization orientation.

5. The optical pickup as claimed in claim 4, wherein said reflective coating device changes the phase angle delay absolute value of a "P" state minus an "S" state for one or two or all of said 1-3 types of lights with different wavelengths $\lambda 1$-$\lambda 3$, and thereby said first linear polarized laser lights become circular polarized lights with a formula expressed by |"P" state phase –"S" state phase| degree =(2n+1)×90 degree, n being a non-negative integer.

6. The optical pickup as claimed in claim 4, wherein said reflective coating device changes the phase angle delay absolute value of a "P" state minus an "S" state for one or two or all of said 1-3 types of lights with different wavelengths $\lambda 1$-$\lambda 3$, and thereby said first linear polarized laser lights become oval polarized lights with a formula expressed by |"P" state phase –"S" state phase| degree =(2n+1)×90 degree ±60 degree, n being a non-negative integer.

7. The optical pickup as claimed in claim 1, wherein said reflective coating device comprises at least one reflective mirror.

8. The optical pickup as claimed in claim 1, wherein said reflective coating device comprises at least one reflective mirror and at least one transmitting mirror.

9. An optical pickup comprising:
- a laser diode for emitting a plurality of first linear polarized laser lights;
- a photo detector integrated circuit for receiving and detecting the signal strength of a reflected light reflected from a recording media; and
- an optical element set comprising a grating, a reflective coating device, and an objective lens;
- wherein said optical element set is placed between said laser diode and said photo detector integrated circuit so that said reflective coating device reflects said first linear polarized laser lights into first circular or oval polarized lights to focus on said recording media, said recording media reflects said first circular or oval polarized lights into second circular or oval polarized lights back to said reflective coating device, and said reflective coating device passes a part of said second circular or oval polarized lights to said photo detector integrated circuit and reflects a part of said second circular or oval polarized lights into second linear polarized lights to said laser diode; and
- wherein said first linear polarized laser lights are transmitted to said reflective coating device with an angle of incidence ranging from 150° to 85°.

10. An optical pickup comprising:
- a laser diode for emitting a plurality of first linear polarized laser lights;
- a photo detector integrated circuit for receiving and detecting the signal strength of a reflected light reflected from a recording media; and
- an optical element set comprising a grating, a reflective coating device, and an objective lens;
- wherein said optical element set is placed between said laser diode and said photo detector integrated circuit so that said reflective coating device reflects said first linear polarized laser lights into first circular or oval polarized lights to focus on said recording media, said recording media reflects said first circular or oval polarized lights into second circular or oval polarized lights back to said reflective coating device, and said reflective coating device passes a part of said second circular or oval polarized lights to said photo detector integrated circuit and reflects a part of said second circular or oval polarized lights into second linear polarized lights to said laser diode; and
- wherein an incident polarization orientation angle of said first linear polarized laser lights projecting on said reflective coating device ranges from 10° to 80°, or from 100° to 170°.

* * * * *